US012723629B2

(12) United States Patent
Huber et al.

(10) Patent No.: US 12,723,629 B2
(45) Date of Patent: Sep. 1, 2026

(54) POSITION DETECTION UNIT, CLUTCH ACTUATOR WITH A POSITION DETECTION UNIT, AND VEHICLE CLUTCH WITH A POSITION DETECTION UNIT

(71) Applicant: Knorr-Bremse Systeme Fuer Nutzfahrzeuge GmbH, Munich (DE)

(72) Inventors: Christian Huber, Munich (DE); Matthias Albrecht, Wolfratshausen (DE)

(73) Assignee: KNORR-BREMSE SYSTEME FUER NUTZFAHRZEUGE GMBH, Munich (DE)

( * ) Notice: Subject to any disclaimer, the term of this patent is extended or adjusted under 35 U.S.C. 154(b) by 472 days.

(21) Appl. No.: 17/594,246

(22) PCT Filed: Mar. 26, 2020

(86) PCT No.: PCT/EP2020/058518
§ 371 (c)(1),
(2) Date: Oct. 7, 2021

(87) PCT Pub. No.: WO2020/212110
PCT Pub. Date: Oct. 22, 2020

(65) Prior Publication Data

US 2022/0178407 A1 Jun. 9, 2022

(30) Foreign Application Priority Data

Apr. 16, 2019 (DE) ..................... 10 2019 109 972.2

(51) Int. Cl.

| | |
|---|---|
| ***G01D 3/08*** | (2006.01) |
| ***B03C 1/28*** | (2006.01) |
| ***F16D 48/06*** | (2006.01) |

(52) U.S. Cl.
CPC .............. *F16D 48/06* (2013.01); *B03C 1/286* (2013.01); *B03C 2201/18* (2013.01);
(Continued)

(58) Field of Classification Search
None
See application file for complete search history.

(56) References Cited

U.S. PATENT DOCUMENTS 7,318,403 B1 * 1/2008 Huart ...................... F02B 63/04 123/179.25
2005/0051422 A1 * 3/2005 Rietzel .............. H01J 37/32568 204/192.12

(Continued)

FOREIGN PATENT DOCUMENTS

CN 101487687 A 7/2009
CN 102112766 A 6/2011

(Continued)

OTHER PUBLICATIONS

Title: Magnetic Permeability; URL: https://www.nde-ed.org/Physics/Materials/Physical_Chemical/Permeability.xhtml#:~:text=For%20non%2Dferrous%20metals%20such,the%20relative%20permeability%20is%20one.; Year accessed: 2024 (Year: 2024).*

(Continued)

*Primary Examiner* — Stephen D Meier
*Assistant Examiner* — Ruben C Parco, Jr.
(74) *Attorney, Agent, or Firm* — NORTON ROSE FULBRIGHT US LLP

(57) ABSTRACT

A position detection unit for detecting a position of an actuating element, disposed within a housing of a clutch actuator of a vehicle clutch, including: a magnetic encoder element in the housing of the clutch actuator on the actuating element, a sensor outside the housing of the clutch actuator and is configured so that it has a detection space within
(Continued)

which the sensor can detect a position of the magnetic encoder element within a predefined range of motion of the magnetic encoder element, and a protective device to prevent ferritic filings attracted by the magnetic encoder element from being deposited within the detection space. Also described is a related clutch actuator.

14 Claims, 3 Drawing Sheets

(52) U.S. Cl.
CPC ...... *B03C 2201/30* (2013.01); *F16D 2300/12* (2013.01); *F16D 2300/18* (2013.01); *F16D 2500/3026* (2013.01)

(56) References Cited

U.S. PATENT DOCUMENTS

| | | | | |
|---|---|---|---|---|
| 2006/0180398 | A1 | 8/2006 | Khalil et al. | |
| 2013/0141082 | A1* | 6/2013 | Zhou | G01B 7/003 324/207.13 |
| 2014/0084905 | A1* | 3/2014 | Shestakov | G01R 33/072 324/207.13 |
| 2015/0345637 | A1 | 12/2015 | Huber et al. | |
| 2018/0163792 | A1 | 6/2018 | Baur et al. | |

FOREIGN PATENT DOCUMENTS

| | | | | |
|---|---|---|---|---|
| CN | 103671618 | A | 3/2014 | |
| CN | 109576567 | A | 4/2019 | |
| CN | 109774377 | A | 5/2019 | |
| CN | 209035775 | U | 6/2019 | |
| CN | 110067819 | A | 7/2019 | |
| CN | 110546394 | A | 12/2019 | |
| CN | 110709617 | A | 1/2020 | |
| DE | 19652785 | A1 * | 6/1998 | F16D 25/12 |
| DE | 102008041181 | A1 * | 2/2009 | F15B 15/2807 |
| DE | 102009016298 | A1 * | 10/2009 | G01D 5/145 |
| DE | 102009037500 | A1 | 2/2011 | |
| DE | 102014220171 | A1 | 4/2016 | |
| DE | 102015215963 | A1 * | 2/2017 | |
| DE | 102016205162 | A1 * | 10/2017 | |
| DE | 102017111086 | A1 * | 11/2018 | F16D 25/083 |
| DE | 102017112069 | A1 | 12/2018 | |
| DE | 102017112607 | A1 | 12/2018 | |
| DE | 102017215387 | A1 | 3/2019 | |
| JP | 2008201312 | A * | 9/2008 | |
| JP | 2011-112170 | A | 6/2011 | |
| JP | 2014-167159 | A | 9/2014 | |
| WO | 2014180480 | A1 | 11/2014 | |

OTHER PUBLICATIONS

International Search Report for PCT/EP2020/058518 Issued May 26, 2020.

* cited by examiner

POSITION DETECTION UNIT, CLUTCH ACTUATOR WITH A POSITION DETECTION UNIT, AND VEHICLE CLUTCH WITH A POSITION DETECTION UNIT

FIELD OF THE INVENTION

The present invention relates to a position detection unit, in particular a position detection unit for detecting a position of an actuating element of a clutch actuator of a vehicle clutch, which allows accurate position detection.

BACKGROUND INFORMATION

Position detection units which detect positions of actuating elements with the help of a magnetic encoder element and a sensor which detects a magnetic field are known in the art. However, the requirements in terms of the accuracy of the position detection are becoming ever more rigorous, even when detection has to take place under difficult conditions, namely in an environment with different types of contamination.

In the case of commercial vehicles, for example, transmission automation is assuming an increasingly important role, as it offers substantial advantages in terms of fuel consumption and wear minimization compared with manual transmissions. One component of transmission automation is, among other things, a clutch actuator with mandatory position detection. In many applications, a position sensor which is being used detects the position of a working piston through an aluminum wall of the clutch actuator, said working piston actuating the clutch, in other words engaging and disengaging it, through its linear movement. For this purpose, a target—a permanent magnet connected to the working piston—is used as an encoder element. Magnetic sensor elements, such as Hall chips or magneto-inductive sensors, e.g. based on the PLCD principle, are used for magnetic sensing, in order to achieve the greatest possible accuracy.

However, the magnetic force of the encoder element means that ferritic filings are attracted, said filings being produced by abrasion of the flywheel, for example. The ferritic filings, mixed with organic substances, for example from abrasion of the clutch plate and lubricants, such as oil or grease, then adhere to the aluminum wall of the clutch actuator as contamination.

However, the ferritic particles which become adhered change the magnetic field of the encoder element being detected, which means that the sensor is no longer able to correctly detect a directional position of the working piston.

Because a central disengaging mechanism has a safety-relevant function, a clutch position, in particular a biting point, must be detected very accurately. For this reason, the contamination must have no effect on a directional signal.

SUMMARY OF THE INVENTION

The problem addressed by the invention is that of solving the above problems and providing a position detection unit which guarantees accurate detection of a position of an actuating element by a magnet, even under environmental conditions involving ferritic contamination.

The problem may be solved by a position detection unit according to claim 1, a clutch plate according to claim 10, and a vehicle clutch according to claim 13. Advantageous developments are contained in the dependent claims.

According to one aspect of the invention, a position detection unit for detecting a position of an actuating element disposed within a housing of a clutch actuator of a vehicle clutch comprises a magnetic encoder element which is provided within the housing of the clutch actuator on the actuating element, a sensor which is provided outside the housing (10) of the clutch actuator (2) and is configured and arranged in such a manner that it has a detection space within which the sensor can detect a position of the magnetic encoder element within a predefined range of motion of the actuating element, and a protective device which is configured to prevent ferritic filings attracted by the magnetic encoder element from being deposited.

The detection space of the sensor is defined as a volume adjacent to the sensor, in which the sensor detects a change in a magnetic field. The detection space has an extent within which it is possible for the sensor to detect the position of the encoder element within the predefined range of motion, so that the position of the encoder element can be detected over at least one relevant part of a displacement path of the actuating element. The relevant part of the displacement path is the part in which position detection is necessary for the safe functioning of the clutch actuator.

The protective device prevents ferritic filings which are attracted by the magnetic encoder element from becoming deposited, for example on the housing for the clutch actuator, or being present in the detection space. "Prevents" in this context means that ferritic filings are contained in the detection space only to the extent that they have no influence on an accurate detection of the position of the actuating element.

The protective device prevents ferritic filings attracted by the magnetic encoder element from being deposited within the detection space through three different basic principles. Either the part of the detection space outside the housing of the clutch actuator lies completely within the protective device, so that the ferritic filings cannot get into the detection space. "Completely" in this sense means that the part of the detection space outside the housing of the clutch actuator lies within the protective device to such an extent that the ferritic filings have no functionally relevant effects on the signal of the sensor. On the other hand, it is possible for dimensions of a protective device, in conjunction with a material of the protective device which has a predefined magnetic permeability, to prevent magnetic forces of attraction of the magnetic encoder element from passing into a region outside the detection space, so that the ferritic particles are not attracted by the magnetic encoder element in a region of the detection space and deposited there. Here, too, preventing deposition means that filings are only deposited to the extent that they do not have functionally relevant effects on the signal of the sensor. As a third basic principle, it is possible for the ferritic particles to be attracted by a magnetic force in a region outside the detection space, so that they are prevented from reaching the detection space, wherein here, too, the filings can reach the detection space to such an extent that they have no functionally relevant effects on the signal of the sensor.

According to an advantageous development, the protective device comprises a housing of the sensor which is provided on the outside of the housing of the clutch actuator and is configured in such a manner that it covers the part of the detection space lying outside the housing of the clutch actuator and therefore prevents ferritic filings from becoming deposited due to its dimensions.

The dimensions of the housing of the sensor can easily be adapted to a size of the detection space of the sensor, so that it is possible for the deposition of ferritic filings within the detection space to be prevented cost-effectively and without problems.

In a further advantageous development, the sensor is fastened by a fastening device, wherein the fastening device is configured as a protective device.

When the fastening device is provided, the housing of which prevents ferritic filings from being deposited within the detection space, it is possible for the sensor to be provided with a housing shaped in an arbitrary manner. The sensor is fastened by the fastening device to a housing of the vehicle clutch or the housing of the clutch actuator, for example.

According to a further advantageous development, the protective device is configured in such a manner, due to its dimensions, in conjunction with a material with a predefined magnetic permeability, that it prevents the ferritic filings from adhering to the protective device within the detection space, but allows a position of the magnetic encoder element to be detected.

Magnetic permeability indicates that a material is permeable to a magnetic flux. By coordinating the dimensions of the protective device with the material having a predefined magnetic permeability, it is possible to prevent the ferritic filings from becoming deposited on the protective device within the detection space. On the other hand, the size of the protective device, coupled with the predefined magnetic permeability, is selected so that the position of the magnetic encoder element can be detected. Since no ferritic filings can be deposited on an outer surface of the protective device, it is possible for the dimensions of the protective device to be reduced in such a manner that the outer surface thereof can also be located within the detection space, as a result of which material and weight savings can be made.

According to a further advantageous development, the protective device is configured by its dimensions, in conjunction with a material having a predefined magnetic permeability, to allow ferritic filings to be deposited outside the detection space.

The deposition of ferritic filings on the protective device outside the detection space means that the amount of free filings in the vicinity of the magnetic sensor is reduced, so that the detection space can be kept free of ferritic filings more easily. The use of different materials inside and outside the detection space, for example, allows deposition to take place on the protective device outside the detection space, while at the same time deposition within the detection space is prevented.

In a further advantageous development, at least one of the housings exhibits a rib, and the rib is configured to allow ferritic filings to be deposited in a region of the rib.

In this development, apart from the effect that the amount of free filings is reduced, the strength of the housing is also increased.

According to a further development, the protective device comprises a magnet which is arranged outside the detection space, and the magnet is configured to attract the ferritic filings in order to prevent the deposition of ferritic filings within the detection space, in particular in that the magnet (14) is provided with a sufficiently strong magnetic force.

This magnet can also reduce the amount of free filings in the vicinity of the magnetic sensor, so that the detection space is easier to keep free from ferritic filings. This magnet can be arranged in a favorable position, so that as many ferritic filings as possible can be deposited there, so that they do not penetrate the detection space.

In an advantageous development, the sensor is configured as a sensor according to the magnetic measuring principle.

With the help of these sensors, the position of the actuating element can be accurately determined with relatively simple arrangement.

In another advantageous development, the sensor takes the shape of a Hall sensor, in particular a 2D Hall sensor or a 3D Hall sensor or a magneto-resistive sensor, in particular a giant magneto-resistive sensor, or a tunnel-magneto-resistive sensor.

An accurate, or highly accurate, detection of the actuating element is made possible by these sensors.

According to a further aspect of the invention, the clutch actuator comprises the position detection unit, wherein the protective device comprises the housing of the clutch actuator which is configured by its dimensions, in conjunction with the material having a predefined magnetic permeability, in such a manner that it prevents ferritic filings from being deposited on the protective device within the detection space, but allows the position of the magnetic encoder element to be detected.

If the housing of the clutch actuator is configured to prevent ferritic filings from being deposited, the sensor and the fastening device can be used with any housing shape.

In a further advantageous development, the housing of the clutch actuator has a greater wall thickness within a region of the detection space of the sensor than outside the region of the detection space of the sensor.

By providing the greater wall thickness within the region of the detection space, the entire detection space can be contained within an outside area of the wall of the housing of the clutch actuator, which is possible with only a small amount of additional expense.

In an advantageous development, the housing of the sensor, of the fastening device, or of the clutch actuator is configured to completely contain the part of the detection space outside the housing of the clutch actuator.

This development means that no ferritic filings can penetrate the detection space, without providing additional devices.

According to another advantageous development, depressions are provided on the housing of the clutch actuator, which are configured to form collection pockets to allow ferritic filings to be deposited therein.

By providing the collection pockets, the ferritic filings can be collected, so that freely movable ferritic filings within a housing of the vehicle clutch are reduced, so that they do not get into the detection space.

According to a further aspect of the invention, the vehicle clutch comprises the position detection unit.

By providing the position detection unit or the clutch actuator in the vehicle clutch, it is possible for the position of the actuating member of the vehicle clutch to be accurately detected, even under environmental conditions with ferritic contamination.

The invention is explained in detail with reference to the attached drawings.

DETAILED DESCRIPTION

Figures 1, 2:
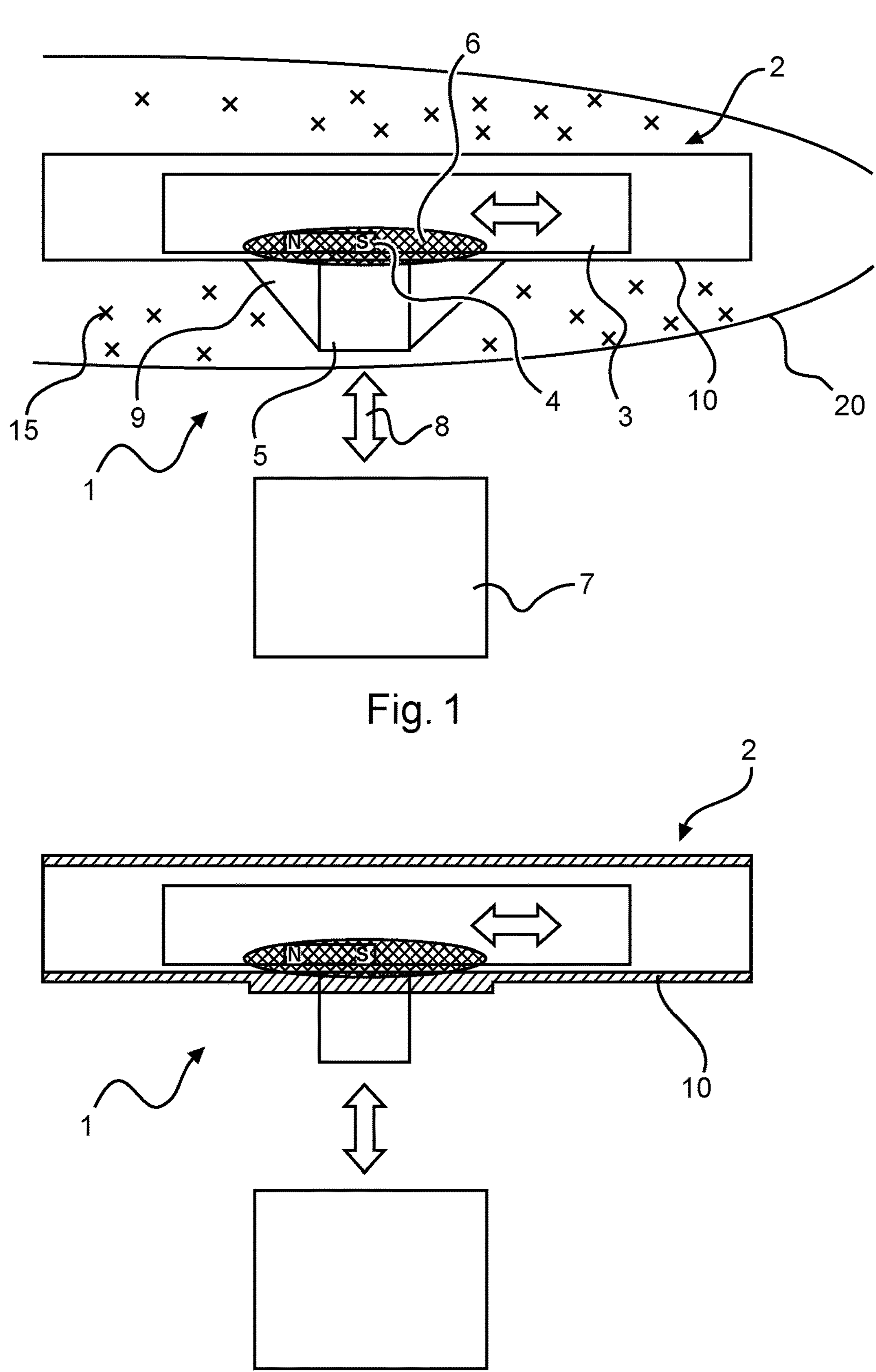
FIG. 1 shows a schematic depiction of a position detection unit according to a first embodiment.
FIG. 2 shows a schematic depiction of a position detection unit according to a second embodiment.

FIG. 1 shows a schematic depiction of a position detection unit 1 according to a first inventive embodiment. The position detection unit 1 is provided in a schematically indicated vehicle clutch 20, in particular on a clutch actuator 2 of the vehicle clutch 20. The clutch actuator 2 is configured as a central disengaging mechanism, but can alternatively also be provided as a clutch actuator arranged at another point. The clutch actuator 2 comprises an actuating element 3. The actuating element 3 is firstly used to set a disengaging state of the central disengaging mechanism 2. The clutch actuator 2 is provided as a hydraulically operated disengaging mechanism, so that the actuating element 3 is provided as a piston in a hydraulic cylinder. Alternatively, other drive principles are also conceivable, wherein the actuating element 3 is configured as a spindle of an electrical linear drive, for example.

The position detection unit 1 comprises a magnetic encoder element 4. The magnetic encoder element 4 is connected, or fastened, to the actuating element 3, so that the magnetic encoder element 4 follows the movements of the actuating element 3 and, moreover, the movement of the actuating element 3 can be detected. The encoder element 4 is provided within a housing 10 of the clutch actuator 2.

In addition, the position detection unit 1 comprises a sensor 5. The sensor 5 is configured and arranged in such a manner that it detects a position of the magnetic encoder element 4 within a predefined range of motion of the encoder element, so including the actuating element 3. The sensor 5 is configured as a Hall sensor. In alternative embodiments, a 2D Hall sensor or a 3D Hall sensor is provided, in particular, or another sensor is provided according to the magnetic measuring principle, for example a magneto-resistive sensor, in particular a giant magneto-resistive sensor, or a tunnel magneto-resistive sensor.

The predefined range of motion of the actuating element 3, and therefore of the magnetic encoder element 4, is a stroke of the piston, which is necessary to transfer the clutch at least from a completely engaged state to a completely disengaged state, and vice versa.

The sensor 5 is configured in such a manner that it can cover a detection space 6. To be more precise, the detection space 6 of the sensor 5 is a volume adjacent to the sensor 5, in which the sensor 5 detects a change in a magnetic field. The detection space 6 has dimensions within which it is possible for the sensor 5 to allow a position, and a change in position, of the magnetic encoder element 4 within the predefined range of motion to be detected via the change in the magnetic field through a displacement of the magnetic field of the magnetic encoder element 4. Consequently, the position of the encoder element 4, and therefore the actuating element 3, can be detected along the stroke path of the piston.

As depicted by a double arrow 8, the sensor 5 is connected to a transmission control 7, so that said sensor 5 is supplied with power and data can be exchanged.

In addition, the position detection unit 1 has a protective device which is configured to prevent ferritic filings 15 attracted by the magnetic encoder element 4 from being deposited within the detection space 6. In this context, preventing the deposition of ferritic filings 15 attracted by the magnetic encoder element 4 means that ferritic filings 15 can only enter the detection space 6 to the extent that they do not have a detrimental effect on accurate detection of the position of the actuating element 3. The ferritic filings 15 are produced through abrasion of a flywheel of the vehicle clutch 20, for example, and can spread within a housing of the vehicle clutch 20.

The protective device in this first embodiment has a housing 9 of the sensor 5 which, by virtue of its dimensions, is configured to prevent ferritic filings 15 from being deposited within the detection space 6. This means that the housing 9 of the sensor 5 has dimensions, wherein the detection space 6 outside the housing 10 of the clutch actuator 2 is covered in large parts, at best, completely, so that the part of the detection space 6 outside the housing 10 of the clutch actuator 2 lies in large parts, at best completely, within the protective device, so that the deposition of ferritic filings 15 is prevented, or the ferritic filings 15 do not have any functionally relevant effects on the signal of the sensor 5.

FIG. 2 shows a schematic depiction of the position detection unit 1 according to a second embodiment. The second embodiment differs from the first embodiment in that the dimensions of the housing 9 (FIG. 1) of the sensor 5 are such that the housing 9 does not completely cover the detection space 6 outside the housing 10 of the clutch actuator 2, but the housing 10 of the clutch actuator 2, within which the magnetic encoder element 4 is arranged, is configured by its dimensions to prevent the deposition of ferritic filings 15 within the detection space 6. For this purpose, the detection space 6 is completely contained within an outer area of the housing 10 of the clutch actuator 2. To this end, the housing 10 of the clutch actuator 2 has a greater wall thickness in the region of the detection space 6 of the sensor 5 than outside the detection space 6 of the sensor 5. In order to represent this property more effectively, the housing 10 of the clutch actuator 2 is shown as a sectional depiction in FIG. 2. Alternatively, it is not strictly necessary for the wall thickness of the housing 10 of the clutch actuator 2 to be greater in the region of the detection space, provided said detection space 6 lies within the outside area of the housing 10.

In addition, the protective device is optionally configured due to its dimensions, in conjunction with a material which has a predefined magnetic permeability, to allow adhesion of the ferritic filings 15 at points outside the detection space 6. This is made possible by the complete coverage of the detection space 6.

Figure 3:
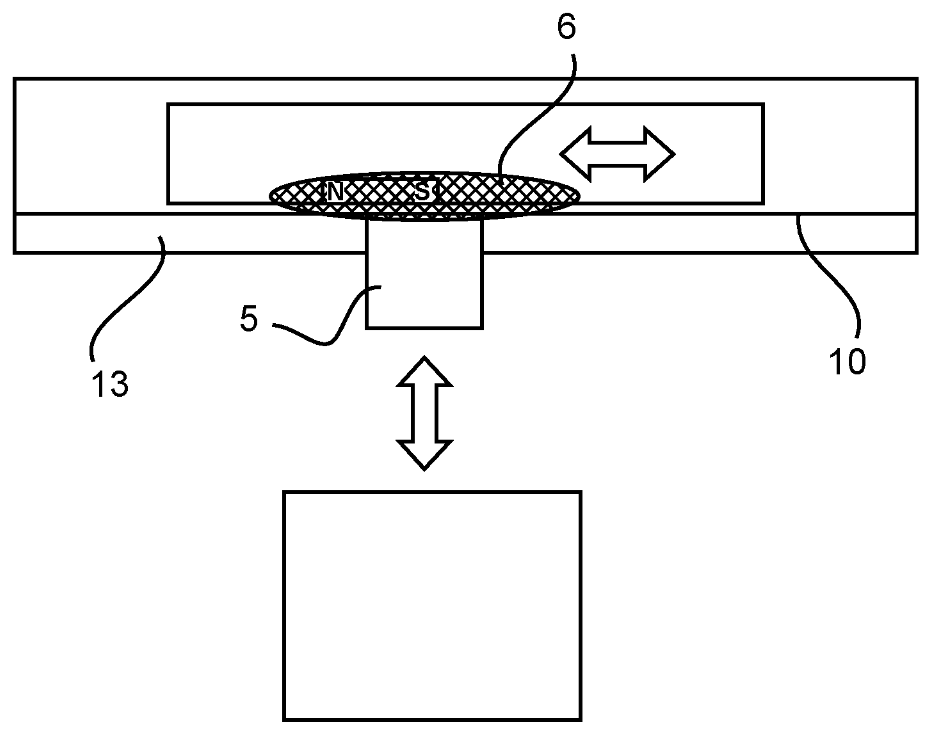
FIG. 3 shows a schematic depiction of a position detection unit according to a third embodiment.

FIG. 3 shows a schematic depiction of a position detection unit according to a third embodiment. The third embodiment differs from the second embodiment in that the detection space 6 is not completely contained within the outside area of the housing 10 of the clutch actuator 2, but that the protective device prevents the adhesion of ferritic filings 15 to the protective device due to its dimensions, in conjunction with the material which has a predefined magnetic permeability. The material of the housing 10 of the clutch actuator 2 therefore has a predefined magnetic permeability which, in conjunction with the wall thickness of the housing 10 of the clutch actuator 2, prevents ferritic filings 15 from adhering to the housing. Therefore, as can be seen in FIG. 3, there is no need for the entire detection space 6 to be covered. This principle of the third embodiment can be applied both to the second embodiment and also to the first embodiment described above and the fourth embodiment described below.

In addition, the housing 10 of the clutch actuator 2 comprises a rib 13. An increase in the strength of the housing 10 is achieved through the rib 13 and, moreover, ferritic filings 15 can also adhere in a region of the rib 13. The rib 13 is arranged adjacent to the sensor 5 in this case. Adhesion of the ferritic filings 15 is achieved by the rib 13 being formed from a material which has a suitable predefined magnetic permeability. In alternative embodiments, the rib 13 can be provided at another point of the housing 10. As a further alternative, multiple ribs 13, ribs on different housings, or no ribs 13 are provided.

Figure 4:
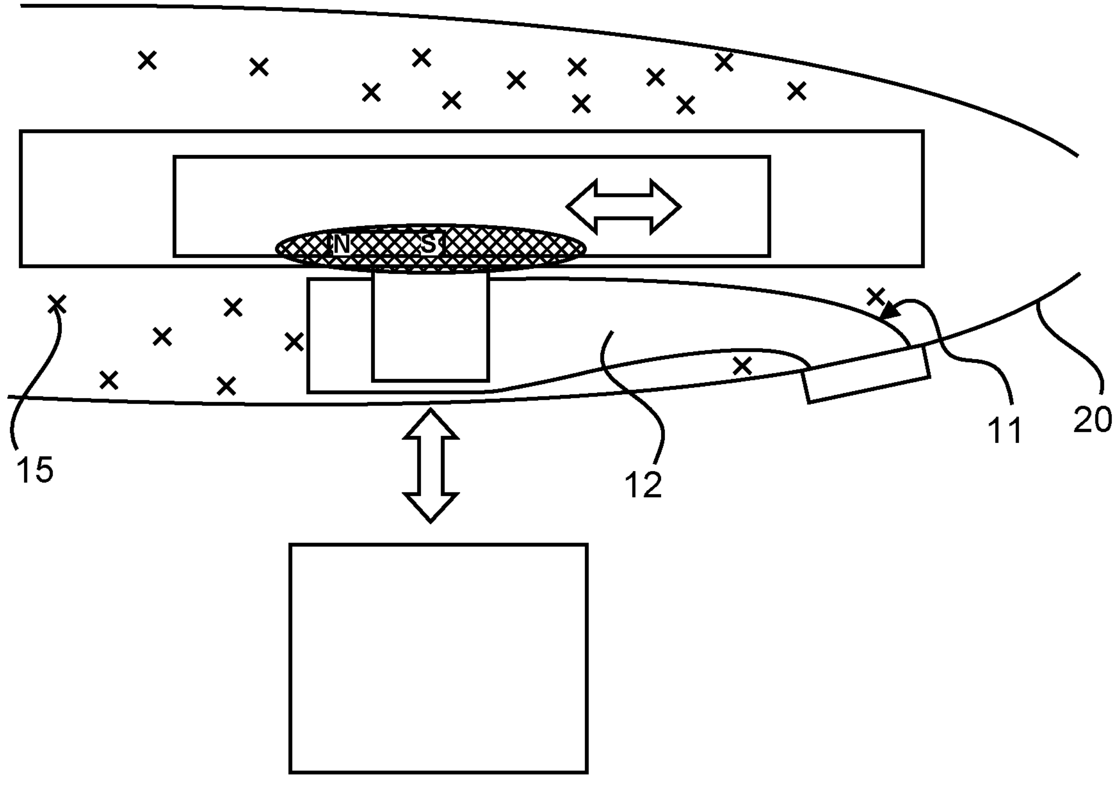
FIG. 4 shows a schematic depiction of a position detection unit according to a fourth embodiment.

FIG. 4 shows a schematic depiction of a position detection unit according to a fourth embodiment. The fourth embodiment differs from the preceding embodiments in that the sensor 5 comprises a fastening device 11 with a housing 12 of the fastening device 11, which housing is configured to enclose the sensor 5 at least in part, and to be fastened to a housing of the vehicle clutch 20. The fourth embodiment also differs in that the housing 12 of the fastening device 11 is configured, due to its dimensions, to prevent the deposition of ferritic filings 15 within the detection space 6. In alternative embodiments, the sensor 5 is not at least partially enclosed by the housing 12 and the sensor 5 is not fastened to the housing of the vehicle clutch 20, but to the housing 10 of the clutch actuator 2, for example.

The fastening device 11 is a solenoid valve unit which comprises solenoid values for controlling the clutch actuator 2. In an alternative embodiment, the fastening device 11 is not the solenoid valve unit, but a holder, for example, which is provided only for holding the sensor 5.

Figure 5:
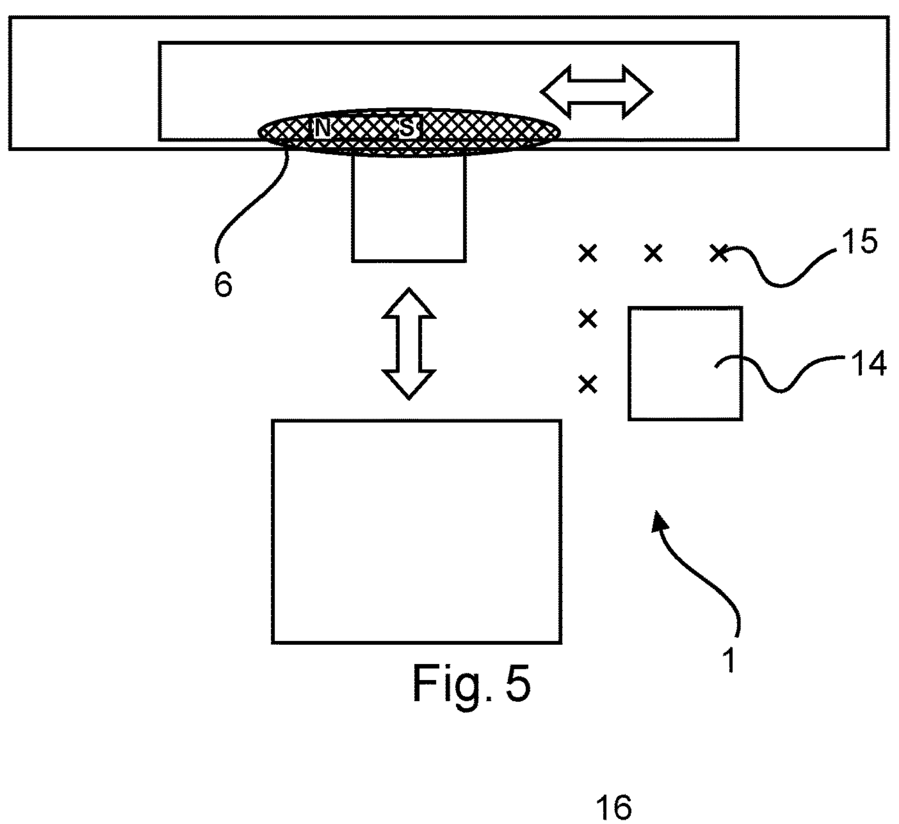
FIG. 5 shows a schematic depiction of a position detection unit according to a fifth embodiment.

FIG. 5 shows a schematic depiction of a position detection unit 1 according to a fifth embodiment. The fifth embodiment differs from the first to fourth embodiment in that the protective device does not directly protect the detection space 6, but that the protective device has a magnet 14 which is arranged outside the detection space 6, and the magnet 14 is configured to attract the ferritic filings 15, in order to keep the detection space 6 free from ferritic filings 15.

The magnet 14 in the fifth embodiment can be combined with the protective devices of the first to fourth embodiments. The features of the first and fourth embodiment can likewise be combined with the features of the second and third embodiment.

Figure 6:
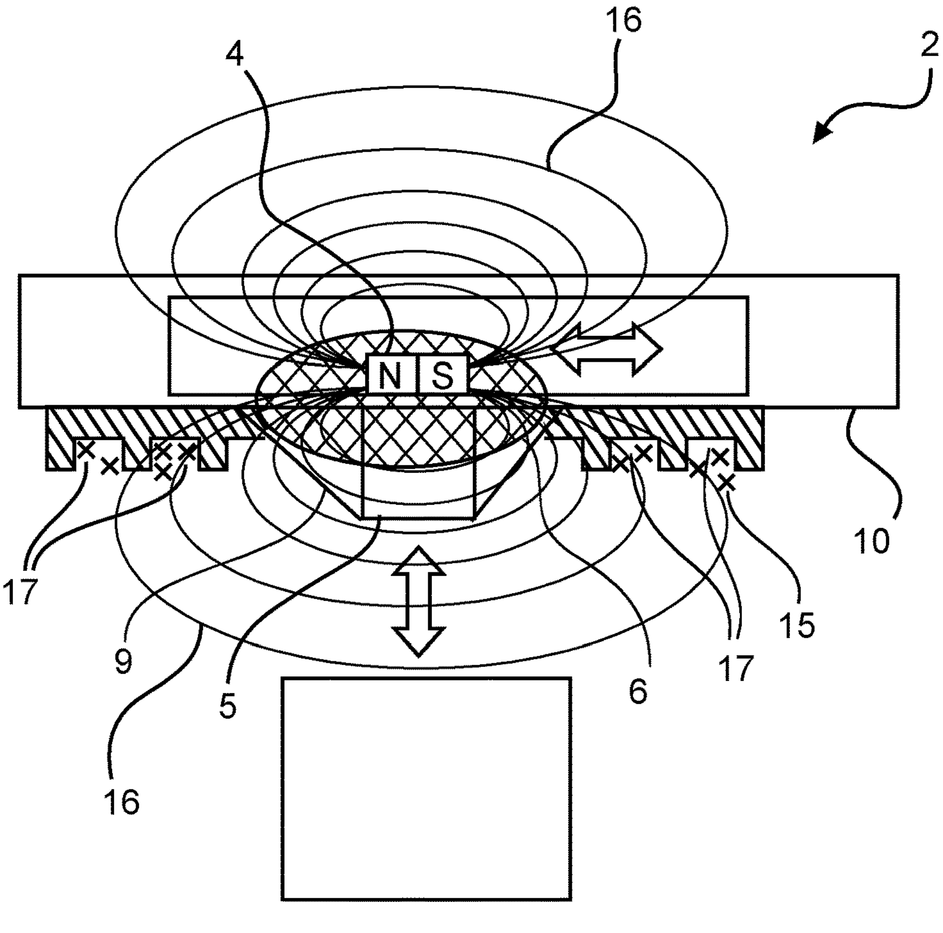
FIG. 6 shows a schematic depiction of a position detection unit according to a sixth embodiment.

FIG. 6 shows a schematic depiction of a position detection unit 1 according to a sixth embodiment. Magnetic field lines 16 of the magnetic field of the magnetic encoder element 4 are also shown in this depiction.

In this embodiment, collection pockets 17 are provided on the housing 10 of the clutch actuator 2. The collection pockets 17 are formed as depressions on the housing 10 of the clutch actuator 2. The depressions are provided in separate elements, so that they are arranged outside the housing 10 of the clutch actuator 2; alternatively, however, they can also be provided recessed in the housing 10 of the clutch actuator 2. The collection pockets 17 are arranged to work together with the dimensions, in conjunction with the magnetic permeability of the adjacent material, so that the ferritic filings 15 are deposited outside the detection space 6 of the sensor 5, but within an active region of the magnetic field lines 16, and are thereby collected in the collection pockets 17. The combination of this embodiment with the first embodiment is depicted in FIG. 6; alternatively, however, it can also be combined with one of the second to fourth embodiment.

THE LIST OF REFERENCE SIGNS IS AS FOLLOWS

1 Position detection unit
2 Clutch actuator
3 Actuating element
4 Magnetic encoder element
5 Sensor
6 Detection space
7 Transmission controller
8 Power supply and data exchange
9 Housing of the sensor
10 Housing of the clutch actuator
11 Fastening device
12 Housing of the fastening device
13 Rib
14 Magnet
15 Ferritic filings
16 Magnetic field lines
17 Collection pocket
20 Vehicle clutch

The invention claimed is:

1. A position detection unit for detecting a position of an actuating element, disposed within a housing of a clutch actuator of a vehicle clutch, comprising:

a magnetic encoder element, which is on the actuating element in the housing of the clutch actuator;

a sensor outside the housing of the clutch actuator and is configured so that it has a detection space within which the sensor can detect a position of the magnetic encoder element within a predefined range of motion of the magnetic encoder element;

and a protective device configured to prevent ferritic filings, which are outside the housing of the clutch actuator, and inside a housing of the vehicle clutch, and which are attracted by the magnetic encoder element, from accumulating inside the detection space;

wherein the protective device includes the housing of the clutch actuator, and separate metal elements including collection pockets, the metal elements being provided on the housing of the clutch actuator, wherein the collection pockets are formed as depressions in the metal elements, so that the metal elements and the depressions are arranged outside the housing of the clutch actuator, wherein each of the metal elements is situated directly adjacent to a housing of the sensor, and each of the metal elements include a plurality of the collection pockets, wherein the collection pockets are arranged outside the detection space of the sensor and within an active region of a magnetic field of the magnetic encoder element, wherein the collection pockets in conjunction with a magnetic permeability of adjacent material of the protective device from which the protective device is made, are configured such that the ferritic filings attracted by the magnetic encoder element are deposited outside the detection space of the sensor and within the active region of the magnetic field, so that the ferritic filings attracted by the magnetic encoder element are collected in the collection pockets, wherein due to dimensions of the protective device in conjunction with a material of the protective device having a predefined magnetic permeability, the protective device is configured to allow the ferritic filings attracted by the magnetic encoder element to accumulate outside of the detection space.

2. The position detection unit of claim 1, wherein the protective device includes the housing of the sensor which is on the outside of the housing of the clutch actuator and is configured so that it covers the part of the detection space lying outside the housing of the clutch actuator, to prevent the ferritic filings from becoming deposited within the detection space due to its dimensions.

3. The position detection unit of claim 1, wherein the sensor is fastened by a fastening device, wherein the fastening device is configured as a protective device.

4. The position detection unit of claim 1, wherein the sensor is configured as a sensor according to a magnetic measuring principle.

5. The position detection unit of claim 4, wherein the sensor includes a Hall sensor, which is a 2D Hall sensor or a 3D Hall sensor or a magneto-resistive sensor, including a giant magneto-resistive sensor, or a tunnel-magneto-resistive sensor.

6. The position detection unit of claim 1, wherein the sensor is connected to a transmission control, so that the sensor is supplied with power and data can be exchanged.

7. The position detection unit of claim 1, wherein the housing of the clutch actuator includes a rib, a magnetic permeability of the rib is such that it allows the ferritic filings to be deposited in a region of the rib.

8. The position detection unit of claim 7, wherein the rib contributes to a strength of the housing of the clutch actuator.

9. The position detection unit of claim 1, wherein the magnetic encoder element is connected or fastened to the actuating element, so that the magnetic encoder element follows movement of the actuating element and the movement of the actuating element is detectable by the sensor.

10. The position detection unit of claim 1, wherein the magnetic encoder element is within the housing of the clutch actuator, and wherein the detection space is a volume adjacent to the sensor.

11. The position detection unit of claim 1, wherein each of the depressions has a rectangular cross section.

12. The position detection unit of claim 1, wherein each of the depressions has at least three sides, two of the three sides being parallel to one another and perpendicular to a third side of the three sides.

13. The position detection unit of claim 1, wherein the protective device includes a magnet that is arranged outside of the detection space and outside of the clutch housing, the magnet being configured to attract the ferritic filings to prevent the ferritic filings from accumulating inside the detection space, by providing the magnet with a magnetic force sufficient to attract at least some of the ferritic filings.

14. The position detection unit of claim 1, wherein the protective device is made of different materials inside and outside the detection space.

* * * * *